(12) United States Patent
Miyawaki et al.

(10) Patent No.: US 11,214,358 B2
(45) Date of Patent: Jan. 4, 2022

(54) AIRCRAFT CONTROL SYSTEM, AIRCRAFT CONTROL METHOD, AND AIRCRAFT

(71) Applicant: SUBARU CORPORATION, Tokyo (JP)

(72) Inventors: Takashi Miyawaki, Tokyo (JP); Masakatsu Abe, Tokyo (JP); Hiroki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 657 days.

(21) Appl. No.: 16/149,801

(22) Filed: Oct. 2, 2018

(65) Prior Publication Data
US 2019/0127051 A1 May 2, 2019

(30) Foreign Application Priority Data
Nov. 2, 2017 (JP) .............................. JP2017-213275

(51) Int. Cl.
*B64C 23/00* (2006.01)
*B64D 45/00* (2006.01)
*F15D 1/00* (2006.01)
*G01N 29/04* (2006.01)
*G01N 29/44* (2006.01)
*G01N 29/24* (2006.01)

(52) U.S. Cl.
CPC ............ *B64C 23/005* (2013.01); *B64D 45/00* (2013.01); *F15D 1/0075* (2013.01); *G01N 29/041* (2013.01); *G01N 29/043* (2013.01); *G01N 29/245* (2013.01); *G01N 29/4472* (2013.01); *B64C 2230/12* (2013.01); *B64D 2045/0085* (2013.01); *G01N 2291/2694* (2013.01)

(58) Field of Classification Search
CPC ..... B64C 23/005; B64D 45/00; F15D 1/0075; G01N 29/041; G01N 29/043; G01N 29/245; G01N 29/4472
See application file for complete search history.

(56) References Cited

U.S. PATENT DOCUMENTS

| 8,046,177 B2 * | 10/2011 | Liu ..................... G01N 29/4463 |
| | | 702/35 |
| 9,446,840 B2 * | 9/2016 | Drouin, Jr. ............ H05H 1/2406 |
| 2010/0224733 A1 | 9/2010 | Wood et al. |
| 2011/0253842 A1 | 10/2011 | Silkey et al. |
| 2015/0217855 A1 | 8/2015 | Davies |
| 2015/0267727 A1 | 9/2015 | Segawa et al. |

FOREIGN PATENT DOCUMENTS

| JP | 2009-511360 A1 | 3/2009 |
| JP | 2013-530486 A1 | 7/2013 |
| JP | 2014-103094 A1 | 6/2014 |
| JP | 2015-527247 A1 | 9/2015 |
| JP | 2016-056814 A1 | 4/2016 |

\* cited by examiner

*Primary Examiner* — Justin M Benedik
(74) *Attorney, Agent, or Firm* — Troutman Pepper Hamilton Sanders LLP (57) ABSTRACT

An aircraft control system includes a flow control device and a control circuit. The flow control device is configured to control a flow of air around an aircraft. The control circuit is configured to control the flow control device so that a pressure distribution loaded on a surface of a structure that constitutes the aircraft is equal to a control value of a pressure distribution calculated based on a physical quantity detected by a sensor provided in the aircraft. The physical quantity relates to the air.

13 Claims, 4 Drawing Sheets

AIRCRAFT CONTROL SYSTEM, AIRCRAFT CONTROL METHOD, AND AIRCRAFT

CROSS-REFERENCE TO RELATED APPLICATIONS

The present application claims priority from Japanese Patent Application No. 2017-213275 filed on Nov. 2, 2017, the entire contents of which are hereby incorporated by reference.

BACKGROUND

1. Technical Field

Examples of the present invention relate to an aircraft control system, an aircraft control method, and an aircraft.

2. Related Art

Flows of air of an aircraft around wings such as main wings and empennage have been controlled by operating moving surfaces such as ailerons (see, for instance, Japanese Unexamined Patent Application Publication (Translation of PCT Application) (JP-T) No. 2015-527247). In recent years, use of a plasma actuator (PA) as an auxiliary device for controlling flows of air around wings of an aircraft has been studied (see, for instance, JP-T No. 2009-511360, JP-T No. 2013-530486, Japanese Unexamined Patent Application Publication (JP-A) No. 2014-103094, and JP-A No. 2016-056814).

SUMMARY OF THE INVENTION

An aircraft control system according to an aspect of the present invention includes a flow control device and a control circuit. The flow control device is configured to control a flow of air around an aircraft. The control circuit is configured to control the flow control device so that a pressure distribution loaded on a surface of a structure that constitutes the aircraft is equal to a control value of a pressure distribution calculated based on a physical quantity detected by a sensor provided in the aircraft. The physical quantity relates to the air.

In addition, an aircraft according to an aspect of the present invention may include the aircraft control system.

In addition, an aircraft control method according to an aspect of the present invention may control the flow control device using the aircraft control system.

An aircraft control method according to an aspect of the present invention includes: controlling a flow of air around an aircraft using a flow control device; and controlling the flow control device so that a pressure distribution loaded on a surface of a structure that constitutes the aircraft is equal to a control value of a pressure distribution calculated based on a physical quantity detected by a sensor provided in the aircraft. The physical quantity relates to the air.

DETAILED DESCRIPTION

Aircraft control systems, aircraft control methods, and aircrafts according to examples of the present invention will be described with reference to the attached drawings. Note that the following description is directed to illustrative examples of the disclosure and not to be construed as limiting to the technology. Factors including, without limitation, numerical values, dimensions, shapes, materials, components, positions of the components, and how the components are coupled to each other are for purposes of illustration to give an easier understanding of the technology, and are not to be construed as limiting to the technology, unless otherwise specified. Further, elements in the following example examples which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the technology is omitted.

A DBD-PA that forms a flow of air using dielectric barrier discharge (DBD) is a practical plasma actuator to be attached to wings of an aircraft. A DBD-PA is a PA in which electrodes having a dielectric therebetween are disposed and a high AC voltage is applied between the electrodes to generate plasma on only one side of the dielectric. A DBD-PA is used to prevent separation of air by controlling plasma and change an airflow.

It is desirable to control flows of air around the airframe of an aircraft more appropriately.

First Example (Structure and Function of Aircraft Control System)

Figure 1:
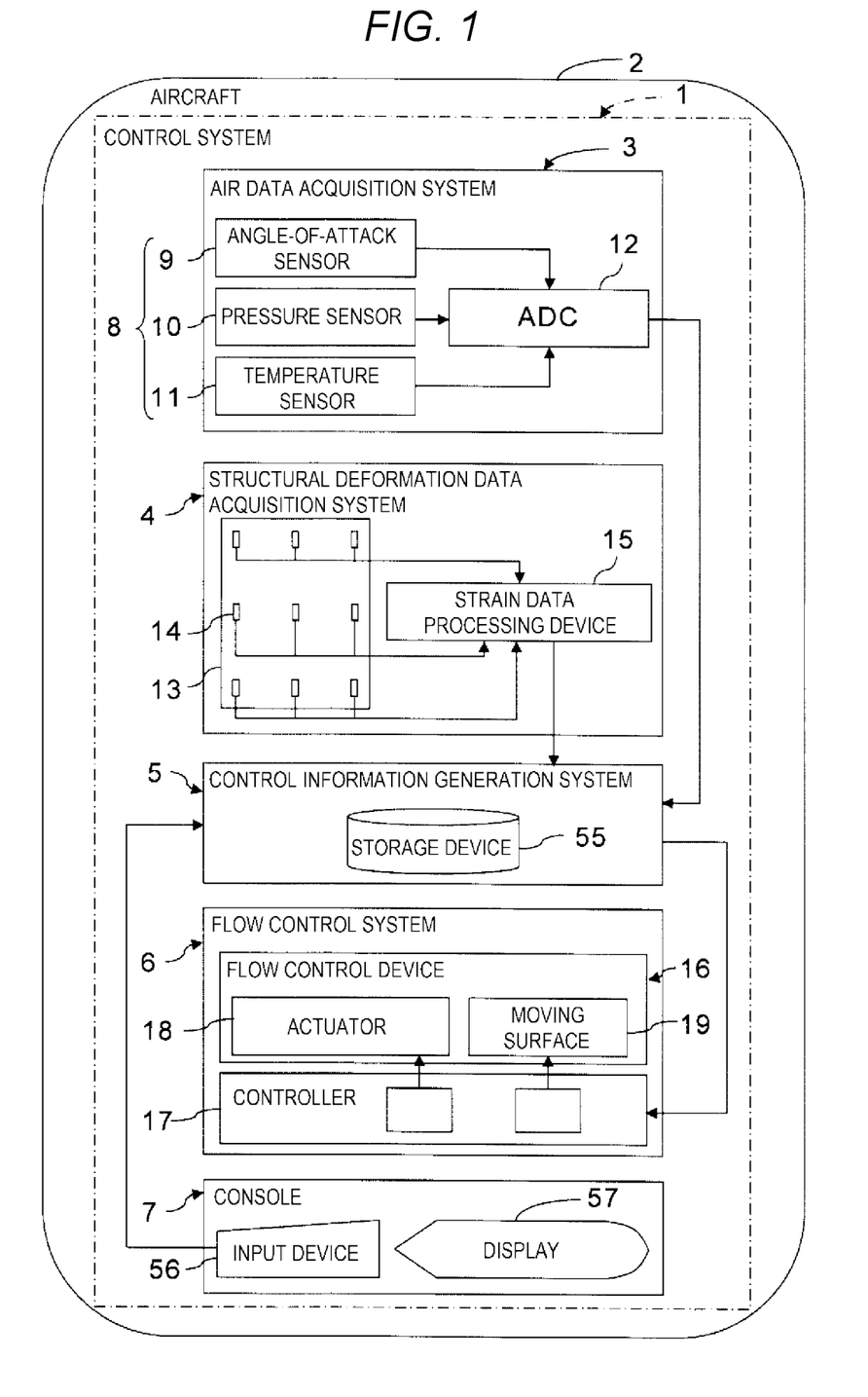
FIG. 1 is a structural diagram illustrating an aircraft control system according to a first example of the present invention.

FIG. 1 is a structural diagram illustrating an aircraft control system according to a first example of the present invention.

A control system 1 is a system that controls a flow of air around an aircraft 2. Accordingly, the control system 1 is installed in the aircraft 2. The control system 1 for the aircraft 2 may include an air data acquisition system 3, a structural deformation data acquisition system 4, a control information generation system 5, a flow control system 6, and a console 7.

The air data acquisition system 3 is a system that acquires information indicating the relationship between the aircraft 2 and surrounding air and comes standard with the aircraft 2. The information indicating the relationship between the aircraft 2 and surrounding air is referred to as air data and is represented by parameters indicating the state of air around the aircraft 2 and the relative motion of the target part with respect to air. Typical parameters representing air data include an atmospheric pressure altitude, an air speed, a Mach number, an air temperature, an angle of attack, an air density, and an atmospheric pressure.

The air data acquisition system 3 may include a plurality of sensors 8 for measuring physical quantities, such as an angle-of-attack sensor 9, a pressure sensor 10, and a temperature sensor 11. The plurality of sensors 8 may be coupled to an ADC (air data computer) 12.

The angle-of-attack sensor 9 detects an angle of attack that represents the direction of a flow of air around the aircraft 2. Instances of the pressure sensor 10 include a static pressure sensor for detecting the static pressure around the aircraft 2 and a full pressure sensor for detecting the full pressure, which is the pressure of a stagnation point of air at a tip of the aircraft 2. It should be noted here that the full pressure is also referred to as the total pressure. The pressure sensor 10 such as a static pressure sensor and a full pressure sensor may be implemented by a sensor such as a static tube, a pitot static tube, or a static hole. The temperature sensor 11 detects an air full temperature obtained by adding the compression heat of air and the heat generated by friction to the temperature of air around the aircraft 2.

An ADC 12 is a calculator that calculates the air data based on the detection signals of physical quantities output from the sensors 8 as electric signals. Accordingly, the ADC 12 may include an electronic circuit that performs the signal processing for the electric signals output from the sensors 8. Of the electronic circuits of the ADC 12, the circuit that performs signal processing for a signal having been converted to digital information by an A/D (analog-to-digital) converter may be implemented by an electronic circuit such as a computer in which a computer program is installed.

When the angle of attack, the static pressure, the full pressure, and the air full temperature are detected using the plurality of sensors 8 including the angle-of-attack sensor 9, the pressure sensor 10, and the temperature sensor 11, it is possible to calculate air data including the atmospheric pressure altitude, the air speed, the Mach number, the air temperature, the angle of attack, the air density, and atmospheric pressure through known calculation based on these four types of detected data.

The structural deformation data acquisition system 4 acquires, as the stress distributions of structures 13, the deformation information of the structures 13 such as the main wings and the fuselage of the aircraft 2 around which flows of air are to be controlled. The structural deformation data acquisition system. 4 may include a plurality of strain sensors 14 and a strain data processing device 15. The plurality of strain sensors 14 are provided throughout the target parts of the structures 13 that constitute the aircraft 2 to detect the three-dimensional stress distributions in the target parts of the structures 13. The plurality of strain sensors 14 are coupled to the strain data processing device 15.

Optical fiber sensors as well as strain gauges may be used as the strain sensors 14. Instances of the optical fiber sensors include fiber Bragg grating (FBG) sensors or phase shifted FBG (PS-FBG) sensors. When the strain sensors 14 are implemented by optical fiber sensors, necessary optical elements such as light sources and optical filters are provided.

The strain data processing device 15 has the function of obtaining the stress distributions of the structures 13 based on detection signals detected by the strain sensors 14. The strain data processing device 15 may include a signal processing circuit for performing the signal processing for electric signals and optical signals output from the strain sensors 14. Of the circuits of the strain data processing device 15, the circuit that performs signal processing for a signal having been converted to digital information by the A/D converter may be implemented by an electronic circuit such as a computer in which a computer program is installed.

The control information generation system 5 has the function of generating control information for controlling the flow control system 6 based on air data around the aircraft 2 acquired from the air data acquisition system 3 and stress distributions of the structures 13 acquired from the structural deformation data acquisition system 4 and the function of providing the generated control information for the flow control system 6. The control information generation system 5 may also be implemented by an electronic circuit such as a computer in which a computer program that processes information acquired from the air data acquisition system 3 and the structural deformation data acquisition system 4 is installed.

The flow control system 6 has the function of controlling a flow of air around the target parts of the structures 13 that constitutes the aircraft 2, according to control information provided by the control information generation system 5. The flow control system 6 may include flow control devices 16 and controllers 17 that control the flow control devices 16.

The flow control devices 16 control flows of air around the target parts of the structures 13 that constitute the aircraft 2. Instances of the flow control devices 16 include actuators 18 and moving surfaces 19 for actively controlling flows of air.

Instances of the actuators 18 that actively control flows of air include plasma actuators, synthetic jet actuators, air jet actuators, and membrane actuators. Instances of the moving surfaces 19 include ailerons, rudders, elevators, flaps, spoilers, and flaperons.

Figure 2:
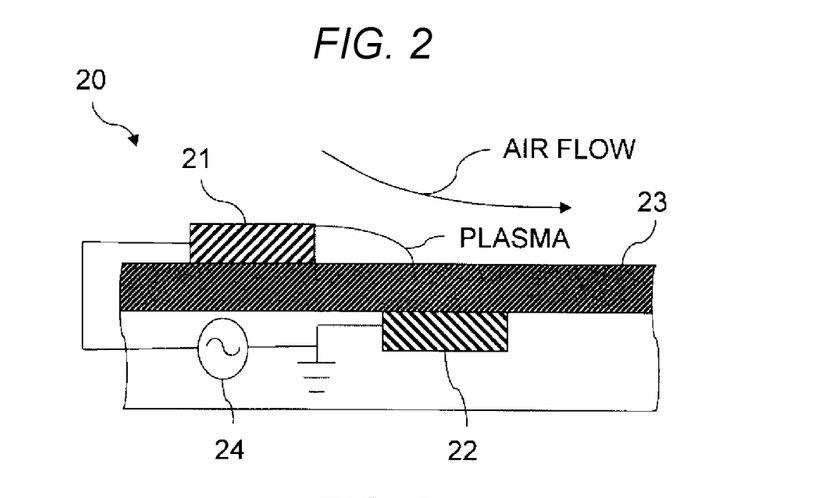
FIG. 2 illustrates the principle of a plasma actuator used as an instance of an actuator illustrated in FIG. 1.

FIG. 2 illustrates the principle of the plasma actuator used as an instance of the actuator 18 illustrated in FIG. 1.

A plasma actuator 20 includes a first electrode 21, a second electrode 22, a dielectric 23, and an AC power supply 24. The first electrode 21 and the second electrode 22 are shifted from each other with the dielectric 23 sandwiched therebetween so as to form a discharge area. The first electrode 21 is disposed so as to be exposed to a space to which a flow of air is induced. On the other hand, the second electrode 22 is covered with the dielectric 23 so as not to be exposed to the space to which a flow of air is induced. In addition, the second electrode 22 is grounded to the airframe of the aircraft 2. An AC voltage is applied between the first electrode 21 and the second electrode 22 by the AC power supply 24.

When an AC voltage is applied between the first electrode 21 and the second electrode 22 by operating the AC power supply 24, plasma including electrons and positive ions is generated in the discharge area on the surface of the dielectric 23 on which the first electrode 21 is disposed. As a result, the plasma induces a flow of air toward the surface of the dielectric 23. It should be noted here that the plasma actuator 20, having the dielectric 23 between the first electrode 21 and the second electrode 22, that causes dielectric barrier discharge is referred to as a DBD-PA.

The first electrode 21 and the second electrode 22 that constitute the plasma actuator 20 may be formed in thin film shapes. Therefore, these films may be pasted not only on the surfaces of wing structures such as stationary surfaces or the moving surfaces 19, but also on the surfaces of the structures 13 such as a fuselage, or may be embedded in the surface layer in the mount position.

Figure 3:
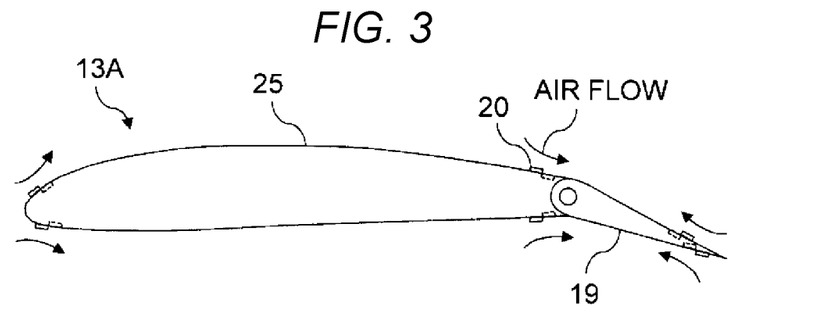
FIG. 3 illustrates an instance in which the plasma actuator illustrated in FIG. 2 is attached to awing structure.

FIG. 3 illustrates an instance in which the plasma actuator 20 illustrated in FIG. 2 is attached to a wing structure 13A.

Each of the wing structures 13A such as the main wings, horizontal stabilizers, and vertical stabilizers having moving surfaces 19 is configured so that the moving surface 19 is coupled to the stationary surface 25. The plasma actuator 20 may be used as auxiliary device for, for instance, the moving surface 19. More specifically, the plasma actuator 20 may be used to reduce air resistance by preventing a separating flow of air on the wing surface of the moving surface 19 and reducing the friction between the wing surface and air.

In this case, the plasma actuator 20 may be attached to the moving surface 19 to be assisted or the stationary surface 25 coupled to the moving surface 19 to be assisted. In addition, when the plurality of plasma actuators 20 is disposed so as to be able to induce flows of air in different directions as illustrated in FIG. 3, the plurality of plasma actuators 20 may also be used as the flow control devices 16 for controlling the attitude of the aircraft 2.

Of course, as illustrated in FIG. 3, by disposing the plasma actuators 20 in any positions such as the front edges of the stationary surfaces 25, flows of air are controlled for desired purposes.

Figure 4:
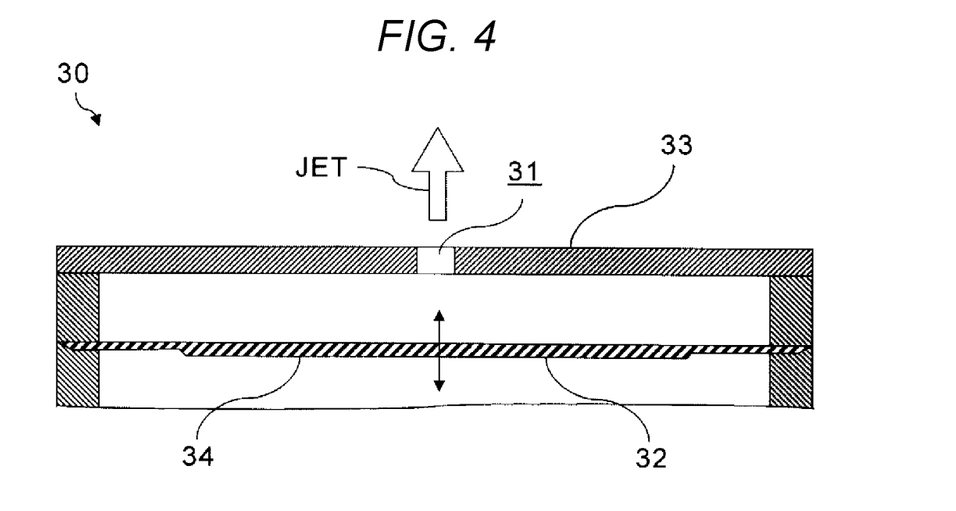
FIG. 4 illustrates the principle of a synthetic jet actuator used as an instance of the actuator illustrated in FIG. 1.

FIG. 4 illustrates the principle of a synthetic jet actuator used as an instance of the actuator 18 illustrated in FIG. 1.

A synthetic jet actuator 30 includes a chamber 33 provided with an orifice 31 and a diaphragm 32. A piezoelectric transducer (PZT) patch 34 is pasted to the diaphragm 32. When the diaphragm 32 is vibrated by driving the PZT patch 34, air is spurted through the orifice 31 periodically. When the synthetic jet actuator 30 is provided, a separating flow is reduced by, for instance, reduction in the form factor on the boundary layer of air or the like.

Figure 5:
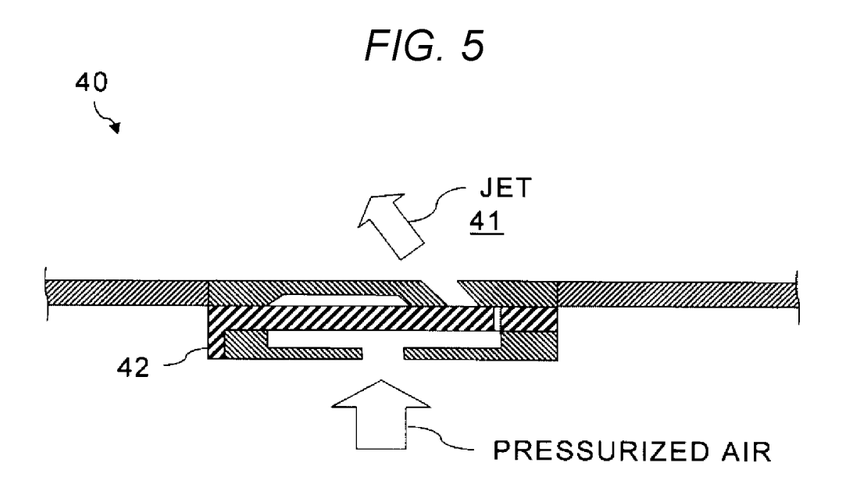
FIG. 5 illustrates the principle of an air jet actuator used as an instance of the actuator illustrated in FIG. 1.

FIG. 5 illustrates the principle of the air jet actuator used as an instance of the actuator 18 illustrated in FIG. 1.

An air jet actuator 40 is implemented by a cantilever PZT actuator 42 that opens and closes a hole 41 that forms the outlet of pressurized air. Air is spurted through the hole 41 periodically by driving the PZT actuator 42. When the air jet actuator 40 is provided, a separating flow is reduced by, for instance, reduction in the form factor on the boundary layer of air or the like.

Figure 6:
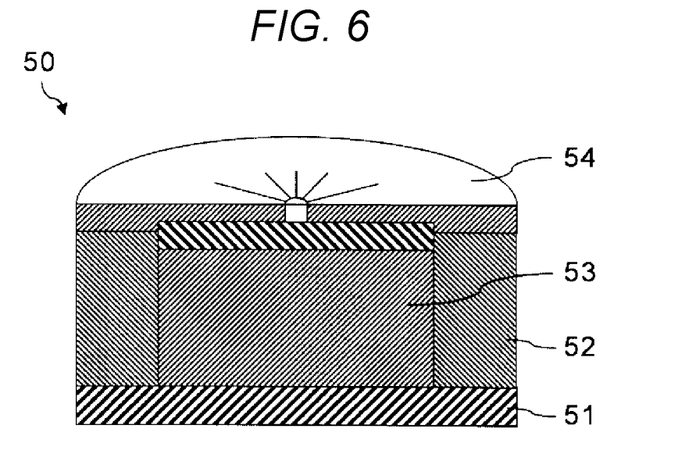
FIG. 6 illustrates the principle of a membrane actuator used as an instance of the actuator illustrated in FIG. 1.

FIG. 6 illustrates the principle of the membrane actuator used as an instance of the actuator 18 illustrated in FIG. 1.

A membrane actuator 50 has the following structure. That is, a ring-shaped spacer 52 is provided on a substrate 51 having a plate shape such as a disc shape. A piezoelectric ceramic device 53 is housed in the ring-shaped spacer 52. The piezoelectric ceramic device 53 is covered with an incised membrane (film) 54 with a gap therebetween. Expansion and contraction of the piezoelectric ceramic device 53 spurt a wavelike turbulent flow through the incision of the membrane 54.

When the membrane actuator 50 is provided, it is possible to control boundary layer transition that makes transition from a laminar flow to a turbulent flow on a boundary layer by, for instance, attenuating T-S (tollmien-schlichting) wave that causes a turbulent flow. It should be noted here that boundary layer transition is also referred to as laminar-flow-to-turbulent-flow transition.

The controllers 17 that control the flow control devices 16 including the various actuators 18 and the moving surfaces 19 described above may be implemented by circuits that generate electric signals or optical signals as control signals according to control information provided by the control information generation system 5 and output the generated control signals to the corresponding flow control devices 16.

More specifically, each of the controllers 17 has a storage device that stores the control amount of the flow control device 16 required for the corresponding flow control device 16 to form a flow of air with the target pressure distribution in the target area. That is, the storage device of each of the controllers 17 stores reference information such as a table or function indicating the relationship between (i) the control value of the target pressure distribution of air in the target area in which a flow of air is to be controlled by the flow control device 16 and (ii) the control amount of the flow control device 16.

Accordingly, when each of the controllers 17 is provided with the control value of the pressure distribution of air in the target area as control information, the control amount of the flow control device 16 is obtained by referencing the storage device that functions as the database that converts the control value of the pressure distribution of air to the control amount of the flow control device 16. The control amount of each of the flow control devices 16 is, for instance, the waveform, the amplitude, and the like of voltage supplied to the actuator 18 when the flow control device 16 is the actuator 18 such as the plasma actuator 20. The control amount of each of the flow control devices 16 is the control amount of an electric actuator or a hydraulic actuator for changing the angle of attack of the moving surface 19 when the flow control device 16 is the moving surface 19.

In contrast, the control information generation system 5 has the function of generating control information for controlling the flow control device 16 including at least one of the actuator 18 or the moving surface 19 through the corresponding controller 17. More specifically, the control information generation system 5 has the function as a control circuit that controls the flow control device 16 so that the pressure distribution loaded on the surface of the target area of the structure 13 that constitutes the aircraft 2 is equal to the control value of the pressure distribution calculated based on the physical quantity which relates to air and which is detected by a sensor of the aircraft 2, such as the sensor 8 provided in the air data acquisition system 3 and the strain sensor 14 provided in the structural deformation data acquisition system 4.

That is, the control value of pressure distribution loaded on the target area surface of the structure 13 that constitutes the aircraft 2 is calculated based on the air data acquired by the air data acquisition system 3 and the stress distribution of the structure 13 acquired by the structural deformation data acquisition system 4. After that, the control information of the flow control device 16 is generated so that the pressure distribution loaded on the target area surface of each of the structure 13 becomes the control value and the generated control information is output to the controller 17 of the flow control device 16.

The control value of the pressure distribution on the surface of each of the structure 13 corresponding to the air data and the stress distribution of each of the structure 13 is calculated by computational fluid dynamics (CFD) analysis using a finite element method (FEM). CFD analysis is numerical analysis that analyzes a flow field by solving an equation relating to the motion of fluid, such as Euler equations or Navier-Stokes equations, using a computer.

Specifically, an analysis model of the structure 13 for CFD analysis is created as a model to which deformation of the structure 13 by an aerodynamic force has been reflected, based on the stress distribution of the structure 13. As a result, when the structure 13 has deformed, the corresponding control value of the pressure distribution on the surface of the structure 13 is obtained. Therefore, more accurate analysis results is acquired than in the case in which CFD analysis is performed by creating an analysis model of the structure 13 without consideration of aerodynamic force deformation of the structure 13.

An analysis model of the structure 13 is created so as to match the area in which a flow of air is to be controlled. For instance, when flows of air around the main wings are to be controlled, an analysis model that simulates the entire main wings is created. In addition, when only a flow of air around the moving surface 19 is to be controlled, an analysis model that simulates only the moving surface 19 may be created. Alternatively, when a restricted area in the vicinity of the position on a wing or a fuselage in which the actuator 18 such as the plasma actuator 20 is mounted is the area in which a flow of air is to be controlled, an analysis model that simulates the part of the structure 13 adjacent to the area in which a flow of air is to be controlled may be created.

If an analysis model to which aerodynamic force deformation of the structures 13 has been reflected is created, CFD analysis is performed on the created analysis model of the structure 13 using air data as an analysis condition. This allows calculation of an appropriate pressure distribution on the wing surface and fuselage surface to form a desired flow of air.

For instance, when the plasma actuator 20 attached to the moving surface 19 or the stationary surface 25 coupled to the moving surface 19 as an auxiliary device of the moving surface 19 is to be controlled, the control value of the pressure distribution on the wing surface of the wing structure 13A is set using CFD analysis so that the air resistance in the part in which the plasma actuator 20 is disposed is minimized.

In contrast, when the attitude of the aircraft 2 is changed to a desired attitude by controlling at least one of the moving surface 19 or the plurality of plasma actuators 20, the control value of the pressure distribution on the wing surface of the wing structure 13A is set optimally so that the attitude of the aircraft 2 becomes the desired attitude. More specifically, the control value of the pressure distribution is set to maximize the lift to drag ratio during flight of the aircraft 2. In addition, when the aircraft 2 performs landing, the control value of the pressure distribution of air appropriate for landing is set.

It should be noted here that the control value of pressure distribution on the surface of the structure 13 corresponding to the stress distribution and air data of the structure 13 having been obtained by CFD analysis is stored as a table in a storage device 55 provided in the control information generation system 5. This enables the control information generation system 5 to set the control value of the pressure distribution on the surface of the structure 13 based on the stress distribution of the structure 13 acquired by the structural deformation data acquisition system 4 and the air data acquired by the air data acquisition system 3 only by referencing the table stored in the storage device 55.

Accordingly, during flight of the aircraft 2, if the air data in a partial circumference of the structure 13 corresponding to an analysis model and the stress distribution in the part of the structures 13 corresponding to the analysis model is acquired by the air data acquisition system 3 and the structural deformation data acquisition system 4, respectively, the control value of the pressure distribution on the surface of the structure 13 is set by referencing the table stored in the storage device 55 or CFD analysis using the analysis model.

The console 7 is an input-output device for operation that has an input device 56 and a display 57. By operating the console 7, a user such as a pilot may provide necessary instruction information to the control information generation system 5. For instance, it is possible to switch the automatic control mode of the flow control device 16 used by the control information generation system 5 between ON and OFF by operating the console 7. That is, the user may manually start up the control information generation system 5 or may start up the control information generation system 5 in conjunction with the startup of the flight control system of the aircraft 2.

If the aircraft 2 is an unmanned aircraft, the console 7 may be provided on the ground so as to allow a flight operator (user) of the unmanned aircraft to operate the aircraft.

(Aircraft Control Method)

Next, the control method for the aircraft 2 using the control system 1 will be described.

Figure 7:
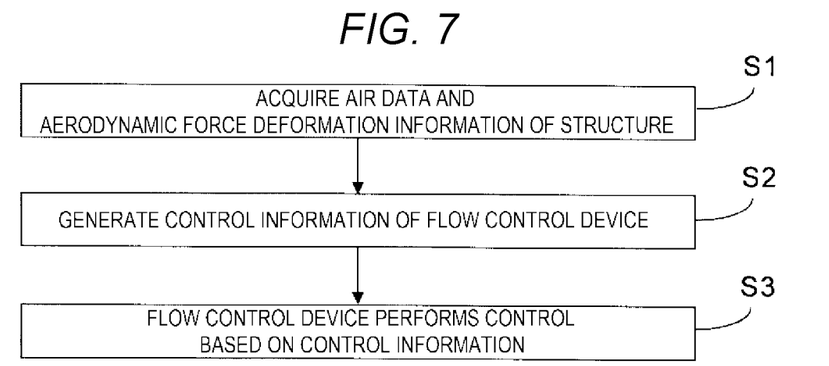
FIG. 7 is a flowchart illustrating a flow of controlling flow control devices of an aircraft using the control system illustrated in FIG. 1.

FIG. 7 is a flowchart illustrating a flow of controlling the flow control device 16 of the aircraft 2 using the control system 1 illustrated in FIG. 1.

First, in step S1, the air data acquisition system 3 and the structural deformation data acquisition system 4 acquire air data and aerodynamic force deformation information of the structures 13, respectively.

That is, based on the detected data such as the angle of attack, the static pressure, the full pressure, and the air full temperature detected by the sensors 8 such as the angle-of-attack sensor 9, the pressure sensor 10, and the temperature sensor 11, the ADC 12 obtains air data such as the atmospheric pressure altitude, the air speed, the Mach number, the air temperature, the angle of attack, the air density, and the atmospheric pressure. The obtained air data is provided for the control information generation system 5.

On the other hand, the stress distributions corresponding to the shapes of the structures 13 deformed by receiving aerodynamic forces are detected by the plurality of strain sensors 14 and the strain data processing device 15. The acquired stress distributions of the structures 13 are provided for the control information generation system 5.

Next, in step S2, the control information generation system 5 generates the control information of the flow control device 16. That is, the control information generation system 5 obtains the control value of the pressure distribution on the surface of the structure 13 by performing CFD analysis based on the air data and the stress distribution of the structure 13 and referencing the table stored in the storage device 55.

For instance, the control value of the pressure distribution on the wing surface of the wing structure 13A is set so as to minimize the air resistance in the target part of the wing structure 13A on which the plasma actuator 20 is disposed. Alternatively, the control value of the pressure distribution on the wing surface of the wing structure 13A is set optimally so as to change the attitude of the aircraft 2 to a desired attitude.

Next, in step S3, the flow control device 16 is controlled based on the control information generated by the control information generation system 5. Specifically, the control value of the pressure distribution on the surface of the structure 13 is provided for the controller 17 of the flow control device 16 by the control information generation system 5. This causes the controller 17 to generate a control signal for the flow control device 16 so as to make the pressure distribution on the surface of the structure 13 equal to the control value and output the generated control signal to the flow control device 16. Thereby, the flow control device 16 operates and the pressure distribution on the surface of the structure 13 is brought to be close to the control value.

For instance, when the flow control device 16 is the moving surface 19, the controller 17 obtains an appropriate angle of attack of the moving surface 19 for bringing the pressure distribution on the wing surface of the moving surface 19 close to the control value. Then, the number of revolutions of a motor that drives the electric actuator for changing the angle of attack of the moving surface 19 and the control amount of a hydraulic pump that drives a hydraulic actuator are generated as control signals by the controller 17 and the generated signals are output to the actuator of the moving surface 19 as electric signals or hydraulic signals. This drives the actuator and changes the angle of attack of the moving surface 19, thereby bringing the pressure distribution on the wing surface of the moving surface 19 close to the control value.

In contrast, when the flow control device 16 is the plasma actuator 20, the controller 17 obtains an appropriate application condition of a voltage to be applied between the first electrode 21 and the second electrode 22 by the AC power supply 24 in order to bring the pressure distribution on the wing surface or the like of the wing structure 13A to which the plasma actuator 20 has been attached, close to the control value. Then, the controller 17 generates the control value of an AC voltage waveform output from the AC power supply 24 as a control signal and outputs the generated signal to the AC power supply 24 as an electric signal. This causes the AC power supply 24 to apply an AC voltage having an appropriate waveform between the first electrode 21 and the second electrode 22 of the plasma actuator 20, thereby enabling induction of a flow of air corresponding to the voltage waveform of the AC voltage through dielectric barrier discharge.

It should be noted here that intermittent application of an AC voltage between the first electrode 21 and the second electrode 22 of the plasma actuator 20 is known to be effective. The waveform with which the period in which an AC voltage is applied and the period in which an AC voltage is not applied are periodically repeated is referred to as a burst waveform and the cycle of a burst waveform is referred to as the burst cycle. Accordingly, the controller 17 of the plasma actuator 20 determines the condition of the AC voltage to be applied as a continuous wave or burst wave.

For the other actuators 18, it is possible to make control for bringing the pressure distributions in the parts to which the actuators 18 have been attached close to the control values by generating control signals using the corresponding controllers 17.

Advantageous Effects

The control system 1 and the control method for the aircraft 2 as described above automatically control the flow control devices 16 (such as the moving surface 19 and the actuator 18 other than the moving surface 19 that actively controls a flow of air) based on the physical quantities relating to air detected by sensors provided in the aircraft 2. In particular, the control system 1 and the control method for the aircraft 2 control the flow control devices 16 optimally by performing CFD analysis processing for not only air data, but also analysis models that simulate aerodynamic force deformation of the structures 13 that constitute the aircraft 2.

In addition, it is also possible to perform feedback control that optimizes air data including the pressure distribution of air for not only the moving surface 19, but also the actuator 18 such as the plasma actuator 20 other than the moving surface 19.

Therefore, the control system 1 and the control method perform more optimum air flow control. That is, the more accurate control value of the flow control device 16 is set by performing CFD analysis processing for the analysis model that simulates aerodynamic force deformation of the structures 13. In addition, it is also possible to perform more optimum air flow control by performing feedback control that optimizes air data including the pressure distribution of air for not only the moving surface 19, but also the actuator 18 such as the plasma actuator 20.

Second Example

Figure 8:
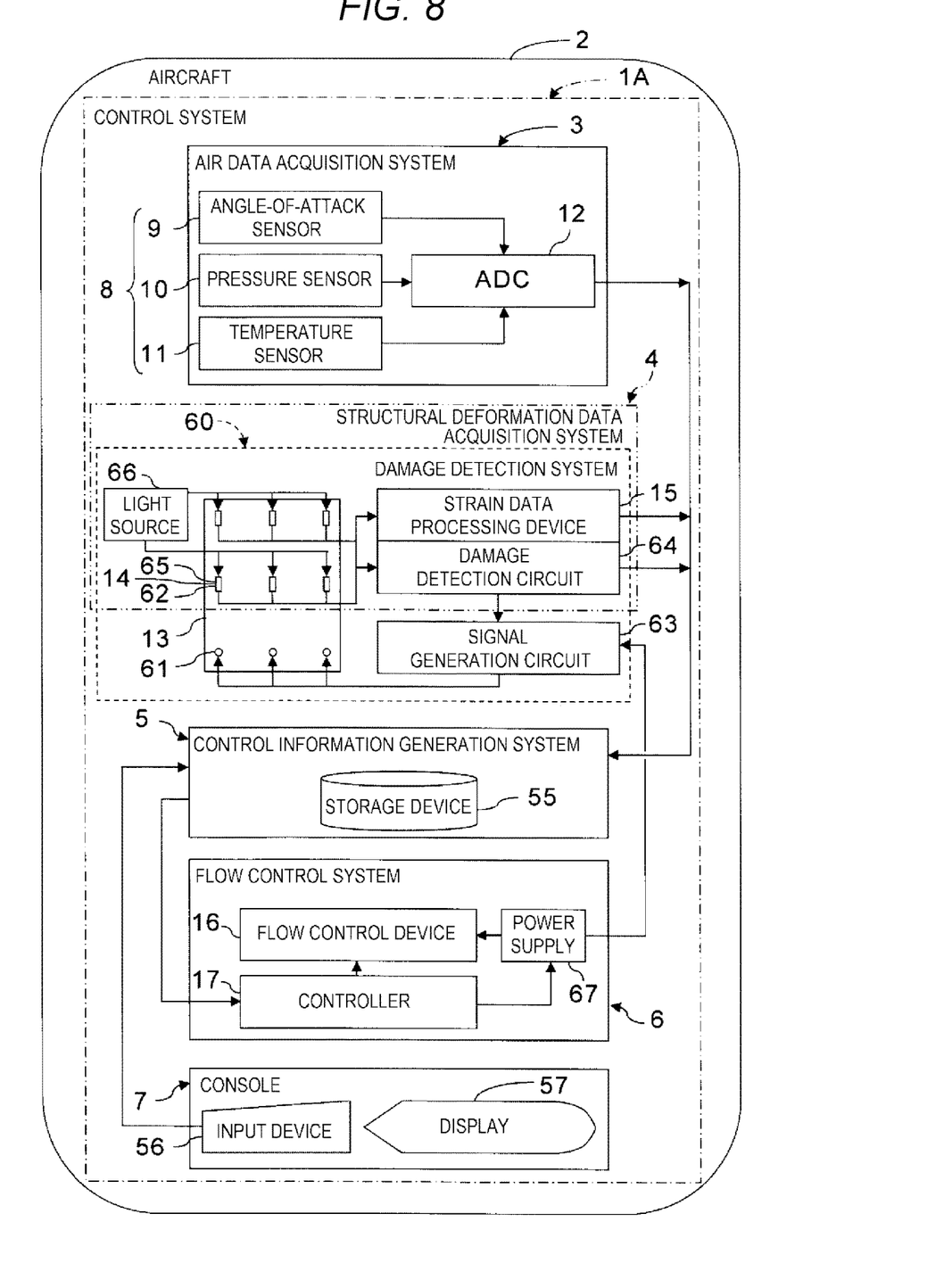
FIG. 8 is a structural diagram illustrating an aircraft control system according to a second example of the present invention.

FIG. 8 is a structural diagram illustrating an aircraft control system according to a second example of the present invention.

The control system 1A for the aircraft 2 according to the second example illustrated in FIG. 8 is different from the control system 1 according to the first example in that the control system 1A has a damage detection system 60 and a detailed function of the control information generation system 5 different from that of the first example. Since the other components and effects of the control system 1A according to the second example are substantially the same as in the control system 1 according to the first example, the same components or the corresponding components are given the same reference numerals to omit descriptions.

The damage detection system 60 is a SHM (structural health monitoring) system that diagnoses the health of the structure 13 by detecting damage in the structure 13. Although any method for detecting damage may be used, it is practical for the damage detection system 60 to detect damage using an ultrasonic inspection from the viewpoint of the detection sensitivity of damage and the commonality of components. When damage is detected by an ultrasonic inspection, the damage detection system 60 may include an ultrasonic transducer 61, a vibration sensor 62, a signal generation circuit 63, and a damage detection circuit 64.

The ultrasonic transducer 61 is a device such as an actuator that emits ultrasound toward the target inspection area of the structure 13 to propagate ultrasound to the structure 13. The vibration sensor 62 detects the reflected wave of ultrasound reflected by the target inspection area of the structure 13 or the transmitted wave of ultrasound having transmitted through the target inspection area. The signal generation circuit 63 is an electric circuit that generates a transmission signal as an electric signal and applies the generated transmission signal to the ultrasonic transducer 61. The damage detection circuit 64 is a signal processing circuit that detects damage based on the waveform signal of ultrasound detected by the vibration sensor 62.

It should be noted here that the vibration sensor 62 may be implemented by an ultrasonic transducer as an acoustic sensor or an optical fiber sensor 65 such as a PS-FBG sensor or FBG sensor that detects ultrasonic vibrations or the like as changes in the amount of high-frequency stress. Accordingly, when the optical fiber sensor 65 is used as the strain sensor 14 that constitutes the structural deformation data acquisition system 4, the optical fiber sensor 65 used as the strain sensor 14 may also be used as the vibration sensor 62. That is, as illustrated in FIG. 8, all of part of the vibration sensor 62 that constitutes the damage detection system 60 and the strain sensor 14 that constitutes the structural deformation data acquisition system 4 may be the common optical fiber sensor 65.

When at least one of the vibration sensor 62 or the strain sensor 14 is the optical fiber sensor 65, a light source 66 that emits laser light to the optical fiber sensor 65 is coupled to the optical fiber sensors 65. Any number of the vibration sensors 62 may be provided in the target inspection areas of the structures 13 as the strain sensors 14 to improve the positional resolution. That is, the detection accuracy of positions in which damage has occurred is improved.

The damage detection circuit 64 is coupled to the output side of the vibration sensor 62. When the optical fiber sensor 65 functions as the vibration sensor 62 and the strain sensor 14, the damage detection circuit 64 and the strain data processing device 15 may be implemented by a common circuit. With this configuration, the common circuit performs similar signal processing. In the instance illustrated in FIG. 8, an optical system is configured so that the transmitted light of the optical fiber sensor 65 is output to the damage detection circuit 64 and the strain data processing device 15 as optical signals. Alternatively, the optical system may include an optical element such as an optical circulator so that the reflected light of the optical fiber sensor 65 is output to the damage detection circuit 64 and the strain data processing device 15 as optical signals.

When the optical signals from the optical fiber sensor 65 are output to the damage detection circuit 64 and the strain data processing device 15, the damage detection circuit 64 and the strain data processing device 15 may be implemented by an optical element, a photoelectric conversion circuit, an electric circuit, and the like that process the optical signals.

The damage detection circuit 64 stores the waveform of the transmitted wave of ultrasound having transmitted through the non-damaged target inspection area or the waveform of the reflected wave of ultrasound reflected by the non-damaged target inspection area as a reference waveform. Therefore, the presence or absence of damage is determined by comparing the waveform of the transmitted wave of ultrasound having transmitted through the target inspection area or the waveform of the reflected wave of ultrasound reflected by the target inspection area with the reference waveform. That is, the presence or absence of damage in a propagation route of ultrasound is detected by determining whether the waveform of the transmitted wave of ultrasound having transmitted through the target inspection area or the waveform of the reflected wave of ultrasound reflected by the target inspection area has been deformed by the effect of damage.

More specifically, when indices such as the least square error indicating the amount of deviation, the cross-correlation coefficient, the difference between peak times, and the difference between the maximum values between the waveform of an ultrasonic signal detected by the damage detection circuit 64 and the reference signal are equal to or more than the threshold or more than the threshold, damage is determined to be present in the target inspection area.

When damage is detected, the position information of the target inspection area in which the damage is present is reported to the control information generation system 5. This enables the control information generation system. 5 to set the control value of the pressure distribution on the surface of the structure 13 by CFD analysis processing using the damage as the constraint of an analysis model simulating the structure 13 when the damage is detected in the structure 13. That is, the control value of the pressure distribution on the surface of the structure 13 is set by CFD analysis of the structure 13 to which the damage has been reflected. This enables control of the flow control device 16 in consideration of damage.

In particular, the position and the size of the damage are detected based on the propagation distance of ultrasound and the acoustic velocity by measuring the time from when the ultrasonic transducer 61 emits ultrasound toward the target inspection area to when the reflected wave of ultrasound reflected by the damage in the target inspection area is detected by the vibration sensor 62 in the damage detection circuit 64. In addition, the approximate position and size of the damage are also detected by detecting the transmitted wave of ultrasound propagating through the target inspection area from a plurality of different directions and determining the direction in which the transmitted wave of ultrasound deformed by the effect of the damage is propagated.

When the position and the size of the damage is detected by an ultrasonic inspection by the damage detection system 60, the position and the size of the detected damage also are reported to the control information generation system 5. This enables the control information generation system. 5 to set the control value of the pressure distribution on the surface of the structure 13 by CFD analysis processing using the position and the size of the damage as the constraint of an analysis model of the structure 13 when the damage is detected in the structure 13.

The emission of ultrasound from the ultrasonic transducer 61 may be performed manually by operating the console 7 or may be performed automatically. When emission of ultrasound is performed manually, if an event occurs in which the structure 13 simulated as an analysis model of CFD analysis may be damaged as in the case in which the aircraft 2 is hit by a lightning strike or the case in which a bird strike occurs in the aircraft 2, a user of the control system 1A such as a pilot or passenger of the aircraft 2 or a remote manipulator of the aircraft 2 may emit ultrasound toward an ultrasonic inspection area of the structure 13 by operating the console 7.

In contrast, in a case where ultrasound is automatically emitted, ultrasound may be emitted intermittently according to a predetermined schedule. Alternatively, a system for detecting a lightning strike may be installed in the aircraft 2 and this lightning strike system and the damage detection system 60 may be ganged together so as to emit ultrasound automatically when a lightning strike is detected.

In another instance, the damage detection circuit 64 may acquire the stress distribution of the structure 13 acquired by the strain data processing device 15 to enable automatic detection of suspicion of damage by performing data processing such as singularity detection on the stress distribution of the structure 13. When suspicion of damage is detected, an ultrasonic inspection of the target inspection area suspected to have damage is automatically performed. That is, when the damage detection circuit 64 controls the signal generation circuit 63 to automatically drive the ultrasonic transducer 61 capable emitting ultrasound for the target inspection area suspected to have damage.

In addition, although emission of ultrasound for an ultrasonic inspection is temporarily, a high-voltage power supply is required to generate a high-frequency signal. On the other hand, the flow control device 16 typified by the plasma actuator 20 may have a high-voltage power supply as a power supply 67. Therefore, the power supply 67 that operates the flow control device 16 may be configured to supply electric power to the signal generation circuit 63.

That is, the common power supply 67 supplies electric power to both the flow control device 16 and the signal generation circuit 63 for emitting ultrasound.

This prevents increase in the weight of the aircraft 2 as compared with the case in which a special high-voltage power supply for emitting ultrasound is provided when the damage detection system 60 that performs an ultrasonic inspection is installed in the aircraft 2.

It should be noted here that the maximum output of the power supply 67 for operating the flow control device 16 is normally determined to become larger than the required output in order to provide redundancy for the power supply 67. Therefore, the power supply 67 for operating the flow control device 16 temporarily performs an ultrasonic inspection while operating the flow control device 16 as the power supply source.

Alternatively, when the structure 13 of the aircraft 2 has been damaged or may have been damaged, the constraint of the flow control device 16 may have been changed. Therefore, when the structure 13 of the aircraft 2 has been damaged or may have been damaged, the operation of the flow control device 16 may be stopped once and ultrasound may be emitted by supplying electric power from the power supply 67 to the signal generation circuit 63. That is, the supply target of electric power from the power supply 67 may be switched from the flow control device 16 to the signal generation circuit 63 of the damage detection system 60.

The control system 1A and the control method for the aircraft 2 according to the second example as described above detect damage in the structures 13 that constitutes the aircraft 2 and, when damage is detected in the structures 13, also simulates the damage in an analysis model for CFD analysis that simulates the structures 13.

Therefore, the control system 1A and the control method for the aircraft 2 according to the second example perform optimum control of the flow control device 16 so as to form a more appropriate flow of air even when the structures 13 are damaged.

Other Examples

Although particular examples have been described above, the described examples are only instances and do not restrict the scope of the present invention. The novel method and device described here may be practiced in various other forms. In addition, in the forms of the method and device described here, various omissions, replacements, and changes may be made without departing from the spirit of the present invention. The appended claims and the equivalents thereof include such various forms and modified examples, which are included in the scope and the spirit of the present invention.

The invention claimed is:

1. An aircraft control system comprising:
   a flow control device configured to control a flow of air around an aircraft;
   a control circuit configured to control the flow control device so that a pressure distribution loaded on a surface of a structure that constitutes the aircraft is equal to a control value of a pressure distribution calculated based on a physical quantity detected by a sensor provided in the aircraft, the physical quantity relating to the air; and
   a damage detection system configured to detect damage in the structure,
   wherein the control circuit is configured to, when the damage is detected in the structure, set the control value of the pressure distribution by performing computational fluid dynamics analysis of the structure to which the damage has been reflected.

2. The aircraft control system according to claim 1, wherein the flow control device is at least one of an actuator configured to control a moving surface or an actuator configured to control the flow of the air.

3. The aircraft control system according to claim 1, further comprising:
   a stress sensor configured to detect a stress distribution of the structure,
   wherein the control circuit is configured to set the control value of the pressure distribution based on the stress distribution.

4. The aircraft control system according to claim 3, wherein an optical fiber sensor is provided as the stress sensor.

5. The aircraft control system according to claim 1, wherein the control circuit is configured to set the control value of the pressure distribution based on air data indicating a relationship between the aircraft and the air around the aircraft.

6. The aircraft control system according to claim 5, wherein the control circuit is configured to control a plasma actuator as the flow control device.

7. The aircraft control system according to claim 1, wherein the control circuit is configured to set the control value of the pressure distribution so as to minimize an air resistance in a part in which a plasma actuator as the flow control device is disposed.

8. The aircraft control system according to claim 1, wherein the control circuit is configured to set the control value of the pressure distribution optimally so that an attitude of the aircraft becomes a desired attitude.

9. The aircraft control system according to claim 1,
   wherein the damage detection system is configured to detect a position and a size of the damage using an ultrasonic inspection and,
   the control circuit is configured to, when the damage is detected in the structure, set the control value of the pressure distribution by performing the analysis processing using the position and the size of the damage as a constraint.

10. The aircraft control system according to claim 1,
    wherein the damage detection system comprises
    an ultrasonic transducer configured to emit ultrasound toward an inspection area of the structure,
    a sensor configured to detect a reflected wave of the ultrasound reflected by the inspection area or a transmitted wave of the ultrasound having transmitted through the inspection area; and
    a signal generation circuit configured to generate a transmission signal and apply the generated transmission signal to the ultrasonic transducer, and
    a power supply configured to operate the flow control device supplies electric power to the signal generation circuit.

11. An aircraft comprising:
    the aircraft control system according to claim 1.

12. An aircraft control method comprising:
    controlling a flow control device configured to control a flow of air around an aircraft, using the aircraft control system according to claim 1.

13. An aircraft control method comprising:
controlling a flow of air around an aircraft using a flow control device; and
controlling the flow control device so that a pressure distribution loaded on a surface of a structure that constitutes the aircraft is equal to a control value of a pressure distribution calculated based on a physical quantity detected by a sensor provided in the aircraft, the physical quantity relating to the air; and
detecting damage in the structure via a damage detection system configured to detect damage in the structure; and
　in response to detecting the damage in the structure, setting the control value of the pressure distribution by performing computational fluid dynamics analysis of the structure to which the damage has been reflected.

\* \* \* \* \*